Patented Apr. 7, 1953

2,634,199

UNITED STATES PATENT OFFICE 2,634,199

PROCESS OF PREPARING A FRICTION IGNITABLE COMPOSITION FOR CIGARS AND CIGARETTES

Anton Lorenzi, Lugano, Switzerland, assignor to Maison Gayco, Geneva, Switzerland, a Swiss firm No Drawing. Application October 28, 1949, Serial No. 124,232. In Switzerland August 20, 1949

2 Claims. (Cl. 52—27)

The present invention concerns cigarettes, cigars, etc. as well as a process of manufacture thereof.

The cigarettes, cigars, etc., treated according to this process, carry at the end which is to be lit, an inflammable substance to be inflamed by friction on an appropriate surface which substance is consumed on its inflammation and produces heat but no toxic or malodorous gases.

According to the process of this invention to an aqueous solution of at least one binding substance, a mixture of at least one finely pulverized oxygen carrier, at least one filling substance and of at least one metal powder is added and is stirred until it takes the consistency of a paste by the addition of a boiled aqueous solution of dextrin whereupon the paste thus obtained is applied on the extremity of the cigarette, cigar or other article which is to be lit, and then is allowed to dry.

As a binding substance, dextrin, gum arabic or tragacanth, or a mixture of these substances, may be used. The appropriate oxygen carriers are either potassium chlorate, potassium chromate, potassium permanganate, or manganese ore, or a mixture of two or more of these substances.

As to the filling substances such as iron oxide, zinc white, glass powder or kieselguhr powder, the zinc white and kieselguhr powder particularly are used to loosen the compound substance, while the glass powder increases the friction properties when the obtained inflammable substance is rubbed on the surface of friction.

The metal powder, particularly aluminium or magnesium powder, allows the mass to be well consumed and causes the radiation of intense heat from the inflamed substance.

No toxic or malodorous gases are produced at the time of combustion due to the basic substances chosen; furthermore, it is possible, by the addition of ethereal oils, to obtain an agreeable odour at the time of lighting.

Hereafter is described an example of the composition of an appropriate and cheap lighting substance:

The gum arabic in aqueous solution is boiled with the tragacanth. To this solution, after being cooled, is added potassium chlorate previously ground very fine while damp.

A carefully ground mixture of potassium bichromate, potassium permanganate, manganese ore at 85%, iron oxide, zinc white, glass powder, kieselguhr powder, aluminium and magnesium powder, is added little by little to the first gum potassium chlorate solution, together with a boiled dextrin solution in water. The mixture thus obtained becomes a thick substance of the consistency of a paste and quite suitable to be smeared on the end of the cigarette or cigar, etc., or permitting to easily dip into it the end of the cigarette, etc.

Hereafter a composition of a substance providing a good surface of friction for the inflammable substances is described:

Dextrin after being soaked in water for 24 hours is boiled and then allowed to cool down. Amorphous phosphorus soaked in water is then added simultaneously by eliminating the excess of water. Then chalk, glass powder, antimony trisulphide powder are added and ground together. The substance thus obtained is applied on the wrapper of the cigarettes or cigars, either directly, or on an intermediate surface, such as thin wood for instance.

The inflammable substance, gently struck on the surface of friction, lights even with a strong wind and gives an intense heat. Applied on the end of the cigarette or cigar, the inflammable substance unfailingly burns the tobacco through the radiant heat.

What I claim is:

1. A method of preparing a safety friction ignitable composition for application to cigars, cigarettes and the like including the steps of boiling an aqueous solution of gum-arabic with gum-tragacanth, cooling the solution, damp grinding potassium chlorate, adding the finely ground potassium chlorate to the mixture of gum-arabic and gum-tragacanth, finely grinding potassium bichromate, potassium permanganate, manganese ore, iron oxide, zinc white, and mixing the same with glass powder, kieselguhr powder, aluminum powder and magnesium powder, adding the mixture to the solution of potassium chlorate and binding agents together with a boiled dextrin solution of dextrin in water until the mixture thus obtained attains the consistency of a paste suitable for application to the end of a cigar, cigarette or the like.

2. A method of preparing a safety friction ignitable composition for application to cigars, cigarettes and the like including the steps of preparing an agglutinant aqueous binding solution, damp grinding potassium chlorate, adding the potassium chlorate to the binding solution, mixing finely ground additional oxygen carriers consisting of at least potassium bichromate and potassium permanganate together with filler substances consisting of at least glass powder, kieselguhr powder, a finely pulverized metal thermite consisting of at least aluminum powder, and finely ground manganese ore, and slowly adding the mixture to the binding solution until the resulting mixture attains a consistency of a paste suitable for application to the end of a cigar, cigarette or the like.

ANTON LORENZI.

REFERENCES CITED

The following references are of record in the file of this patent:

UNITED STATES PATENTS

| Number | Name | Date |
|---|---|---|
| 196,552 | Babcock | Oct. 30, 1877 |
| 594,677 | Chatelan | Nov. 30, 1897 |
| 794,144 | Dunne | July 4, 1905 |
| 1,142,529 | Rodriguez | June 8, 1915 |
| 1,338,389 | Martinez | Apr. 27, 1920 |
| 1,831,760 | Wieben | Nov. 10, 1931 |
| 2,103,698 | Schmid | Dec. 28, 1937 |